No. 735,990. PATENTED AUG. 11, 1903.
L. LYNDON.
REGULATING SYSTEM OF ELECTRICAL DISTRIBUTION.
APPLICATION FILED AUG. 16, 1902. RENEWED JUNE 4, 1903.
NO MODEL.

Witnesses
P. F. Sonnek.
Wm. P. Hammond

Inventor
Lamar Lyndon
By his Attorneys
Knight Bros

No. 735,990. Patented August 11, 1903.

UNITED STATES PATENT OFFICE.

LAMAR LYNDON, OF NEW YORK, N. Y., ASSIGNOR TO NATIONAL BATTERY COMPANY, OF BUFFALO, NEW YORK, A CORPORATION OF NEW JERSEY.

REGULATING SYSTEM OF ELECTRICAL DISTRIBUTION.

SPECIFICATION forming part of Letters Patent No. 735,990, dated August 11, 1903.

Application filed August 16, 1902. Renewed June 4, 1903. Serial No. 160,133. (No model.)

*To all whom it may concern:*

Be it known that I, LAMAR LYNDON, a citizen of the United States, residing at New York, in the county and State of New York, have invented certain new and useful Improvements in Regulating Systems of Electrical Distribution, of which the following is a specification.

My invention relates to regulating systems for electric-current distribution, comprising a booster and a storage battery, and has for its object to insure efficient action of the battery and booster in response to changes in the load.

The accompanying drawings illustrate diagrammatically my invention.

Similar features in the several views are represented by the same reference-letters.

Figure 1:
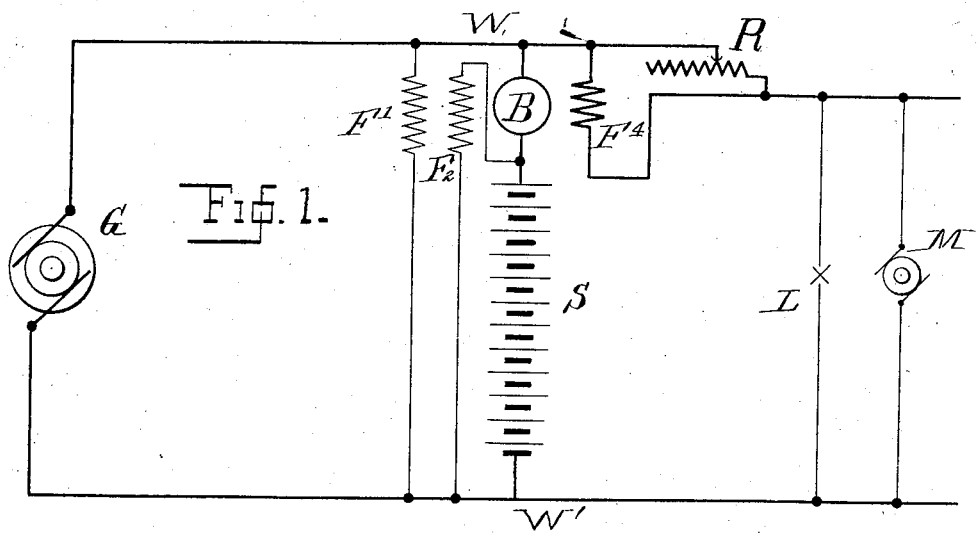
Figure 2:
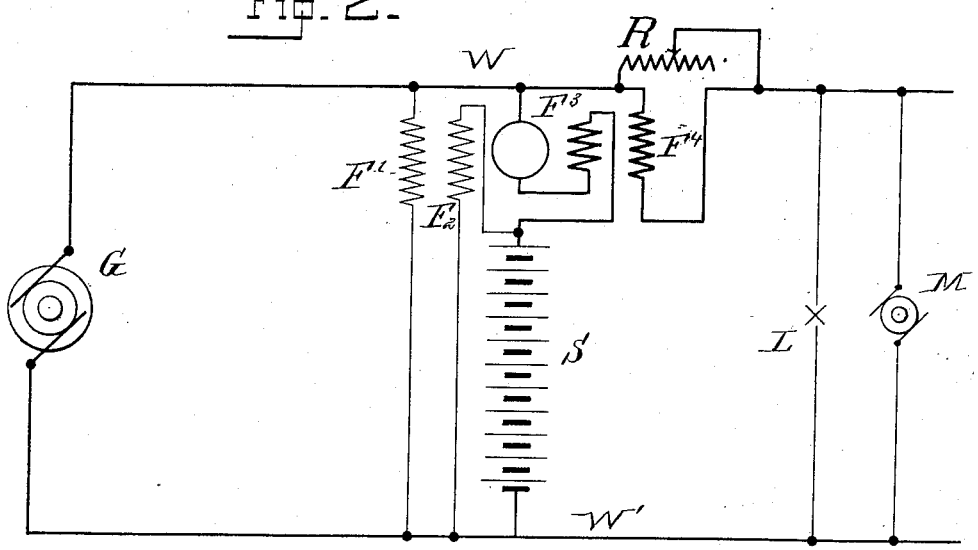

Figures 1 and 2 are views illustrating different forms of the invention.

G represents the main generator, supplying the work-circuit W W'. The translating devices in this circuit are represented by M and L, which may be motors or lights or other devices for converting the current energy into work. The storage battery is indicated at S and the booster at B.

$F'$ $F^2$ represent the field-coils of the booster. The booster field-coil $F'$ is connected across the line, as shown, and wound to cause the booster to feed current out to the "line." Booster field-coil $F^2$ is a shunt-coil between the battery and the line and wound to oppose battery discharge.

In the above arrangement and connections under normal conditions of load the battery is neutral and booster electromotive force is zero, the two magnetomotive forces being equal and opposite. Upon a rise in the load the battery tends to discharge, causing slight diminution in its electromotive force and resulting decrease in the magnetomotive force of $F^2$. The magnetomotive force of $F'$ therefore slightly exceeds that of $F^2$ and causes a booster voltage tending to assist the battery to discharge and take up the excess load. The coils $F'$ and $F^2$ being opposed to each other, the additional current fed to the line will be proportional to the algebraic sum of their effects. In other words, the booster-field is a differential field directly responsive to the fluctuation in voltage at the battery-terminals and is thus in a measure responsive to load fluctuations in the line. Upon a drop in the load the surplus current tends to flow into the battery, raising the battery voltage, thereby increasing the magnetomotive force of coil $F^2$ and producing electromotive force in the booster-armature, assisting to charge the battery.

An additional field-coil $F^3$ is provided in the arrangement shown in Fig. 2 and is a series coil between the battery and the booster wound to assist flow of current either on charge or discharge. The booster-field is still further provided with an additional winding $F^4$, auxiliary to the coil $F'$. This coil $F^4$ is in the main circuit and influences the booster to feed additional current to the line. I have shown at R an adjustable resistance applied to coil $F^4$. It will be understood that adjustable resistances may be applied to any of the coils without departing from my invention.

Having thus described my invention, the following is what I claim as new therein and desire to secure by Letters Patent:

1. In a regulating system of electrical distribution comprising storage battery and booster, field-coils for the booster, one of said coils connected across the main circuit, and another in shunt in the battery-circuit.

2. In a regulating system of electrical distribution comprising storage battery and booster, differential field-coils for the booster, one of said coils connected across the main circuit, and the other in shunt in the battery-circuit.

3. In a regulating system of electrical distribution comprising storage battery and booster, field-coils for the booster, one of said coils connected across the main circuit to induce a booster electromotive force in same direction as the battery electromotive force, another of said coils in shunt in the battery-circuit and inducing a booster electromotive force opposed to the battery electromotive force.

4. In a regulating system of electrical distribution comprising storage battery and booster, a plurality of field-coils for the booster, one of said coils connected across the main circuit and others of said coils constituting a compound winding for the booster-field and interposed between the storage battery and the line.

5. In a regulating system of electrical distribution comprising a storage battery and a booster, a plurality of field-coils for the booster, one of said coils connected across the main circuit to induce an electromotive force in the same direction as the battery electromotive force, another of said coils in shunt with the battery to induce a booster electromotive force opposed to the battery electromotive force and another of said coils in series with the booster-armature.

6. In a regulating system of electrical distribution comprising storage battery and booster, field-coils for the booster, one of said coils connected across the main circuit to induce an electromotive force in same direction as the booster electromotive force, another of said coils in connection between the battery and the line and constituting a compound winding for the booster-field to induce an electromotive force opposing the battery electromotive force.

7. In a regulating system of electrical distribution comprising storage battery and booster, field-coils for the booster, one of said coils responsive to the load changes in the line electromotive force, another of said coils responsive to changes at the battery terminals, a supplementary booster field-coil in the line responsive to changes in the load, and inducing electromotive force in same direction as the battery electromotive force.

8. In a regulating system of electrical distribution comprising storage battery and booster, a booster field-coil connected across the main circuit, differential booster field-coils, one of said differential coils in the line and responsive to changes in the load.

9. In a regulating system of electrical distribution comprising storage battery and booster, field-coils for the booster, one of said coils connected across the main circuit, another of said coils constituting a compound winding for the booster-field and interposed between the storage battery and the line, a supplementary field-coil in the line and a variable shunt resistance for said supplementary field-coil.

LAMAR LYNDON.

Witnesses:
FRANCIS G. COATES,
PAUL MUTTON.